(12) United States Patent
Hirotsune et al.

(10) Patent No.: US 10,937,376 B2
(45) Date of Patent: Mar. 2, 2021

(54) LIQUID CRYSTAL DISPLAY DEVICE

(71) Applicants: Panasonic Liquid Crystal Display Co., Ltd., Hyogo (JP); Pasona Knowledge Partner Inc., Osaka (JP)

(72) Inventors: Satoshi Hirotsune, Hyogo (JP); Katsuji Tanaka, Hyogo (JP)

(73) Assignees: PANASONIC LIQUID CRYSTAL DISPLAY CO., LTD., Hyogo (JP); PASONA KNOWLEDGE PARTNER INC., Osaka (JP)

( * ) Notice: Subject to any disclaimer, the term of this patent is extended or adjusted under 35 U.S.C. 154(b) by 0 days.

(21) Appl. No.: 16/162,349

(22) Filed: Oct. 16, 2018

(65) Prior Publication Data

US 2020/0118502 A1 Apr. 16, 2020

(51) Int. Cl.
*G09G 3/20* (2006.01)
*G09G 3/36* (2006.01)
*G02F 1/1362* (2006.01)
*G02F 1/1333* (2006.01)
*G02F 1/13357* (2006.01)

(52) U.S. Cl.
CPC ....... *G09G 3/3607* (2013.01); *G02F 1/13338* (2013.01); *G02F 1/133602* (2013.01); *G02F 1/136286* (2013.01); *G09G 2300/023* (2013.01); *G09G 2320/066* (2013.01)

(58) Field of Classification Search
CPC .... G06F 3/04815; G06F 3/013; G06F 3/0304; G06F 3/005; G06F 3/1446; G06T 2207/10052; G06T 3/20; G06T 3/40; G06T 3/60; G02B 27/0179; G02B 2027/0185; G02B 6/34; G02B 2027/0127; G02B 2027/0134; G02B 27/22; G02B 27/0093; G02B 5/045; H04N 13/366; H04N 13/383; H04N 13/286; H04N 13/363; H04N 13/279; H04N 13/128; H04N 13/204; H04N 13/271; H04N 13/371; H04N 13/395; H04N 13/398; G09G 3/3607; G09G 2300/023; G09G 2300/0452; G09G 2310/0297; G09G 3/03; G09G 2340/0407; G09G 2300/0465; G09G 2320/0233; G09G 2320/0238;
(Continued)

(56) References Cited

U.S. PATENT DOCUMENTS 8,451,201 B2 5/2013 Hirata et al.
10,311,612 B2 * 6/2019 Kamiyoshihara .... G09G 3/3611
(Continued)

*Primary Examiner* — Duc Q Dinh
(74) *Attorney, Agent, or Firm* — HEA Law PLLC

(57) ABSTRACT

A liquid crystal display device is disclosed utilizing two or more display panels stacked on top of each other. In a dual panel configuration, the first display panel may be comprised of color pixels and the second display panel may be comprised of contrast pixels. The color pixel in the first display panel has a corresponding contrast pixel in the second display panel wherein said contrast pixel is larger in terms of length and in size than the corresponding color pixel. The liquid crystal display device may also switch to a mode that uses an expansion method of contrast pixels to reduce image displacement. Further disclosed is a configuration where the relative position of the first display panel and the second display panel may be adjusted to align the corresponding color and contrast pixels when viewing the display in oblique angles.

4 Claims, 12 Drawing Sheets

(58) Field of Classification Search
CPC ... G09G 2320/0247; G09G 2320/0686; G09G 3/2074
USPC .............. 345/1.1–2.3, 1.1–1.2, 2.1, 4, 5, 6
See application file for complete search history.

(56) References Cited

U.S. PATENT DOCUMENTS

| | | | | |
|---|---|---|---|---|
| 2007/0252804 | A1* | 11/2007 | Engel | G09G 3/36 345/98 |
| 2010/0118006 | A1* | 5/2010 | Kimura | G09G 3/3611 345/205 |
| 2015/0228217 | A1* | 8/2015 | Perdices-Gonzalez | G09G 3/36 345/5 |
| 2015/0355514 | A1* | 12/2015 | Lin | G02F 1/133602 349/44 |
| 2018/0286339 | A1* | 10/2018 | Koudo | G09G 3/3677 |

* cited by examiner

LIQUID CRYSTAL DISPLAY DEVICE

TECHNICAL FIELD

The present disclosure relates to a liquid crystal display device utilizing two or more liquid crystal display panels in a stacked configuration.

BACKGROUND

Liquid crystal displays (LCDs) are nowadays ubiquitous because of many advantages over other display systems such as a cathode ray tube (CRT) display or plasma display. However, LCDs have traditionally suffered in terms of contrast ratio.

One of the techniques for improving the contrast ratio of an LCD device is by stacking LCD panels on top of each other. For example, a prior art discloses a LCD device comprising of a first display panel and a second display panel stacked on top of each other (See, for example, U.S. Pat. No. 8,451,201). The first display panel produces an image based on a first image data and the second display panel produces an image based on a second image data.

As illustrated in FIG. 1, with an LCD device 10 comprising of a first display panel 100 and a second display panel 200 stacked on top of each other, pixel $131_x$ in the first display panel 100 aligns with its corresponding pixel $231_x$ in the second display panel 200 when viewed from a position 2 of a person 1 at a distance H. However, because of a gap D, which may be due to the components of the display panels as well as other components that are positioned between them, the corresponding pixels $131_y$ and $231_y$ may not properly align when the LCD device 10 is viewed by person 1 from position 2. Hence, a person viewing a display device utilizing two or more display panels may experience poor image quality caused by image displacement when viewing the display device from an oblique angle.

To prevent image displacement, it is necessary to keep the gap D as small as possible. However, the use of two or more LCD panels makes image displacement an inherent problem of the multi-display panel configuration because the gap D can only be minimized but not totally removed due to the presence of other components in the display device. The present disclosure describes several techniques and methods to mitigate, if not entirely eliminate, image displacement in LCD devices utilizing two or more display panels in a stacked configuration.

SUMMARY

The present disclosure pertains to an LCD device comprising of two or more display panels stacked on top of each other. In a dual display panel set-up, the first display panel is comprised of color pixels that filter color while the second display panel is comprised of contrast pixels that filter the intensity of light. A backlight unit positioned behind the second display panel provides light to the display panels. Each color pixel in the first display panel has a corresponding contrast pixel in the second display panel. When the corresponding pixels are aligned, the LCD device produces an image with high contrast ratio as compared to a single panel configuration.

Each display panel may be composed of polarizers, a layer of thin film transistors ("TFT"), spacers, and other components of a typical LCD panel. A diffuser may be placed between the two display panels. Each display panel includes a data line driving circuit, a gate line driving circuit, and a timing controller. The driving circuits switch the alignment of the liquid crystal modifying the direction of incident light. A common electrode and a pixel electrode are provided for each pixel or sub-pixel, applying an electric field to the liquid crystal.

The LCD display includes an image processing unit with a color image processor and a contrast image processor. The color image processor generates color image data which controls the color pixels in the first display panel. On the other hand, the contrast image processor generates contrast image data which controls the contrast pixels in the second display panel. Light coming from the backlight unit forms an image when it passes through and is filtered by pairs of corresponding color pixels and contrast pixels.

When multiple LCD panels are positioned in a stacked configuration, the gap between the LCD panels create an inherent problem regarding the alignment of corresponding color pixels and contrast pixels. In a dual LCD panel configuration, the color pixel in the first display panel may not align with the corresponding contrast pixel in the second display panel if the LCD device is viewed at an oblique angle (See FIG. 1). Hence, the resulting image displayed by the LCD device appears less sharp or a double image may be formed. Such image displacement is not ideal because the image quality produced by the LCD device is degraded and the image may become unusable in applications that require viewing the display from an oblique angle.

In an embodiment of the present disclosure, the problem caused by the misalignment of the corresponding color pixels and contrast pixels when viewed from an oblique angle is addressed by utilizing larger size of pixels in one of the display panels. In the LCD device comprising of the first display panel consisting of color pixels and the second display panel consisting of contrast pixels, said contrast pixels in the second display panel are larger in size than the color pixels in the first display panel. In this configuration, the length of a contrast pixel along a first direction may be 1.003 to 1.150 times longer than the length of a color pixel in the same direction. Similarly, the length of a contrast pixel along a second direction perpendicular to the first direction in a plane parallel to the display panels may likewise be 1.003 to 1.150 times longer than the length of a color pixel in the same direction. In terms of the area of the pixels, the area of a contrast pixel may be 1.006 to 1.323 times larger than the area of a color pixel. Consequently, the area of the second display panel containing the contrast pixels may be 1.006 to 1.323 times larger than the area of the first display panel containing the color pixels.

In another embodiment of the present disclosure, a control device is introduced to switch the image processing into a first mode or a second mode. Under the first mode, the LCD device is viewed directly from the center (See FIG. 8A) while under the second mode, the LCD device is viewed from the periphery (See FIG. 8B).

In the second mode, the contrast image data generated by the image processing unit for the contrast pixels is modified using a known expansion method. In the first mode, no or less expansion is applied. The expansion method approximates the correct amount of light provided to a color pixel by a contrast pixel which is not necessarily the corresponding contrast pixel of the color pixel. The expansion method employs averaging the brightness of a corresponding contrast pixel in relation to the brightness of neighboring contrast pixels. As a result, the image produced by the second display panel is less sharp or more blurred than the image produced by the first display panel. However, when the LCD device is viewed from an oblique angle, image displacement is mitigated by the expansion method.

The control device may be operated manually or it may automatically switch from the first mode to the second mode or vice-versa depending on the position of the person viewing the LCD device as detected by a sensing device. The sensing device may be a camera, a proximity sensor, or any device that allows the control device to determine the approximate position of the person.

In another embodiment of the present disclosure, the position of the first display panel may be changed relative to the position of the second display panel or vice versa. The change in relative position between the first display panel and the second display panel may therefore reduce image displacement that causes poor image quality. The change in the relative positions of the display panels ensures alignment of the corresponding color pixels in the first display panel and the contrast pixels in the second display panel when viewed from a particular position. An adjuster device may facilitate the change in the relative position of the display panels. The adjuster device may be configured to change the relative position of the first display panel and the second display panel along the plane parallel to the display areas of the display panels, or along the direction perpendicular to the said plane. The adjuster device may be controlled manually or automatically by employing an appropriate sensing device capable of determining the approximate location of the eyes of the person viewing the LCD device.

BRIEF DESCRIPTION OF THE DRAWINGS

Both described and other features, aspects and advantages of an LCD device in accordance with the embodiments of the present disclosure will be better understood with reference to the following drawings.

DETAILED DESCRIPTION

Embodiments of the present disclosure will be described with reference to the drawings for a greater understanding of the embodiments and so as to help explain the principles used in this disclosure in order to guide person having ordinary skill in the art.

The embodiments in the present disclosure will be presented clearly and in reference to the drawings but in no case shall the present disclosure be limited to these embodiments and drawings. This disclosure herein may be implemented in ways that are not described by the embodiments and drawings but are covered by the present disclosure. The embodiments and drawings in this application are meant to give a full and sufficient disclosure of the invention but the scope of the invention must be defined in respect to the claims appended to this application. Furthermore, the drawings are not necessarily drawn to scale and may be exaggerated for purposes of clarity of presentation. Similarly, number labels are used such that similar reference numbers refer to like or similar elements as used in the other drawings in this specification.

Figure 2:
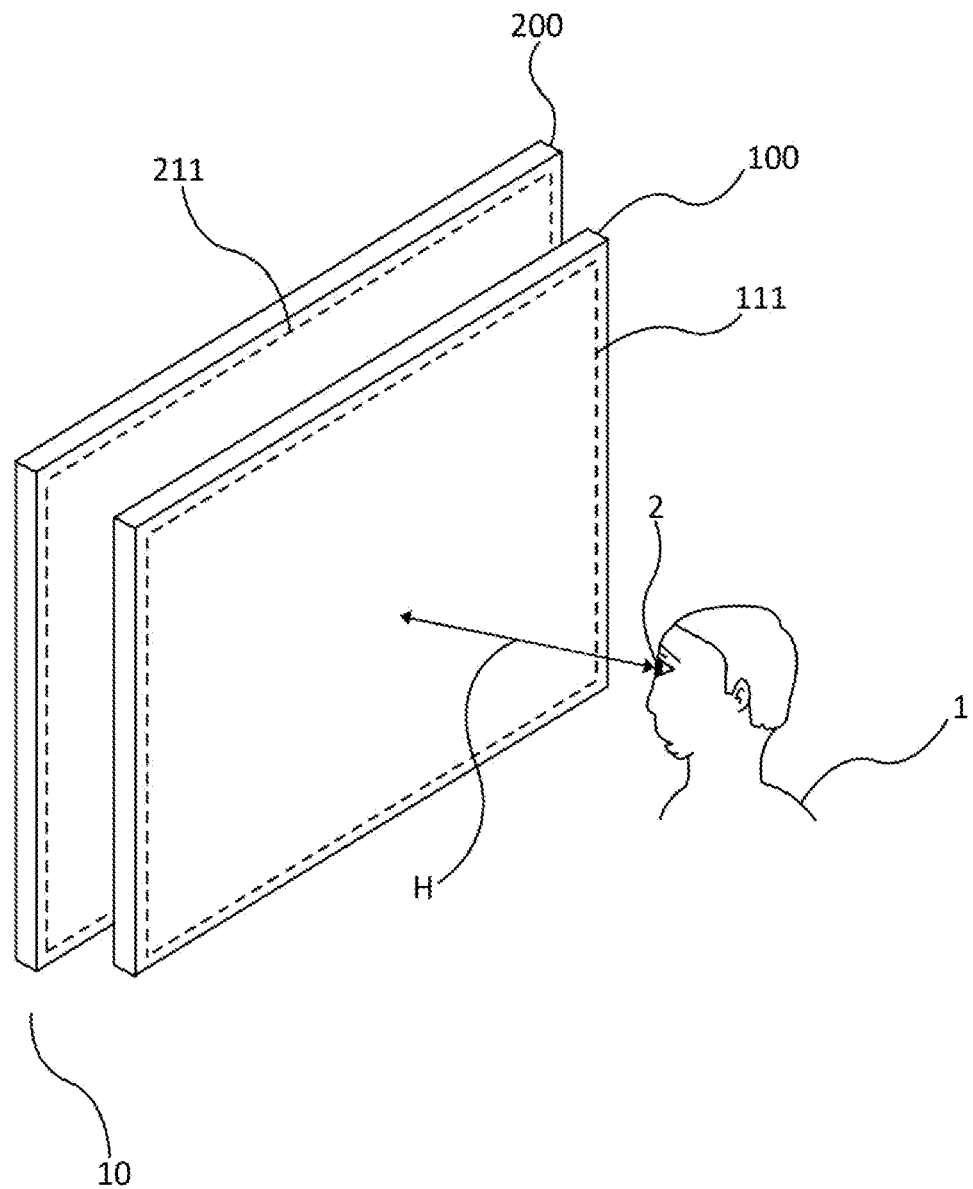
FIG. 2 is a schematic exploded perspective view schematically illustrating an LCD device and a person viewing the said LCD device, according to exemplary embodiments of the present disclosure.

The present disclosure pertains to an LCD device consisting of multiple display panels. FIG. 2 is an exploded view of an LCD device 10 comprising of a first display panel 100, having a display area 111, and a second display panel 200, having a display area 211, stacked on top of each other, in accordance with an embodiment of the present disclosure. The LCD device 10 displays an image that is viewed from a distance H by a person 1 at a position 2, said position 2 is the location of the eyes of person 1.

Figure 3:
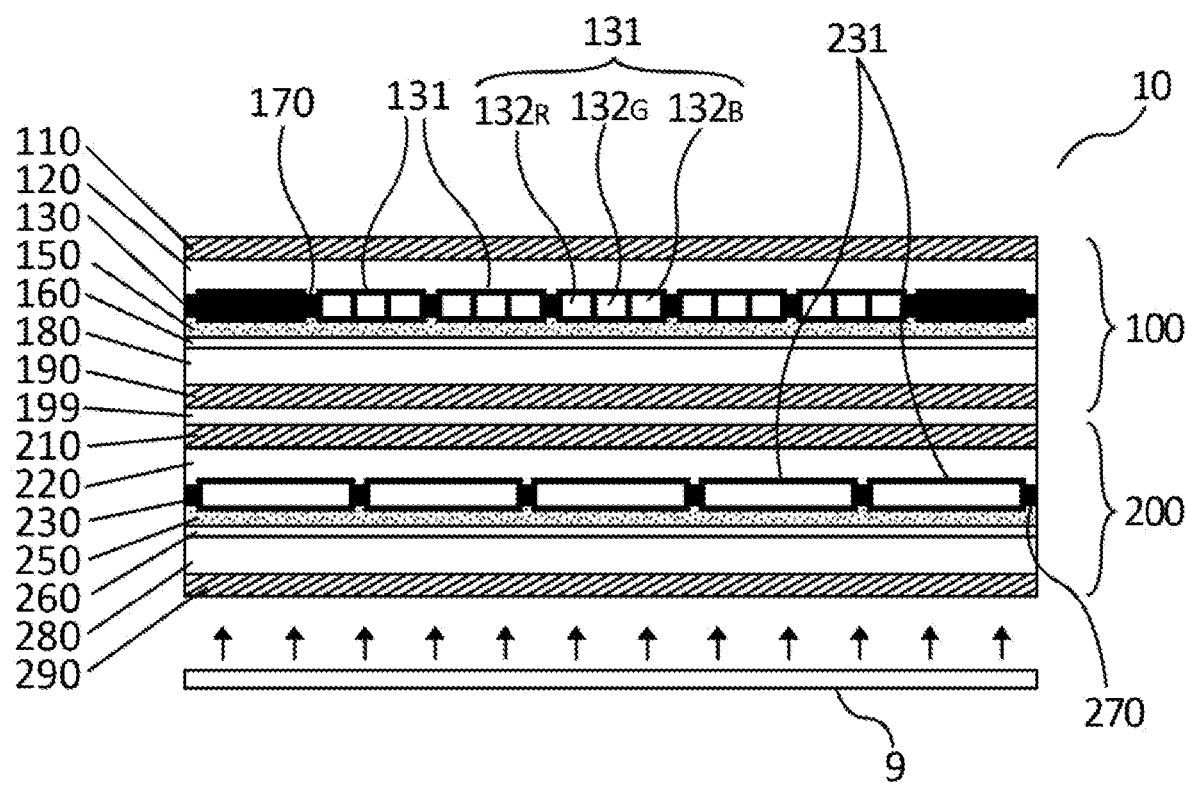
FIG. 3 is a schematic cross-sectional view of the LCD device of FIG. 2 according to the exemplary embodiments of the present disclosure.

FIG. 3 shows cross-sectional view of the LCD device 10 in accordance with an embodiment of the present disclosure. A backlight unit 9 positioned behind the second display panel 200 provides light to the display panels. The first display panel 100 is comprised of a plurality of color pixels 131 that filter color and the second display panel 200 is comprised of a plurality of contrast pixels 231 that filter the intensity of light.

As shown in FIG. 3, each display panel 100, 200 is composed of layered components. Each display panel 100, 200 includes an upper substrate 120, 220 and a lower substrate 180, 280 positioned with the planes parallel to each other and with liquid crystal 150, 250 being sealed in therebetween. The liquid crystal 150, 250 may be a negative liquid crystal having a negative dielectric anisotropy or a positive liquid crystal having a positive dielectric anisotropy.

Each display panel 100, 200 also includes a pair of polarizers 110, 190, 210, 290, a TFT layer 160, 260, black matrix 170, 270, spacers (not shown) and other components built on the substrates 120, 180, 220, 280. A diffuser 199 may be provided between the first display panel 100 and the second display panel 200. The diffuser 199, polarizers 110, 190, 210, 290, upper substrate 120, 220 and lower substrate 180, 280 may be provided as a sheet or layer.

The first display panel 100 further includes of a color filter layer 130 while the second display panel 200 further includes a contrast filter layer 230 that are sandwiched between the upper substrate 120, 220 and the lower substrate 180, 280.

The color filter layer 130 is comprised of a plurality of color pixels 131 consisting of color sub-pixels 132 configured to filter a specific color of light, such as red, green or blue. The color sub-pixel that filters red light, green light and blue light are referred to as red color sub-pixel, green color sub-pixel and blue color sub-pixel, respectively. The different colored sub-pixels repeat along the row of color sub-pixels 132 (See FIG. 4A). A set of adjacent red, green and blue color sub-pixels forms the color pixel 131 of the first display panel 100. It is contemplated that the color sub-pixel 132 is not limited to red, green and blue, and the color pixel 131 may consist of any number of color sub-pixels 132.

The contrast filter layer 230 is comprised of contrast pixels 231 that filter the intensity of light instead of a specific color of light. Each contrast pixel 231 of the second display panel 200 is configured to provide a specific amount of light to its corresponding color pixel 131. The number of color pixels 131 in the first display panel 100 may be equal to the number of contrast pixels 231 in the second display panel 200, in accordance with an embodiment of the present disclosure. Since the color pixel 131 is consist of red, green and blue color sub-pixels 132, the ratio of the number of color sub-pixels 132 to the number of contrast pixels 231 is 3:1. This ratio may vary depending on the number of color sub-pixels 132 comprising the color pixel 131.

Figure 4A:
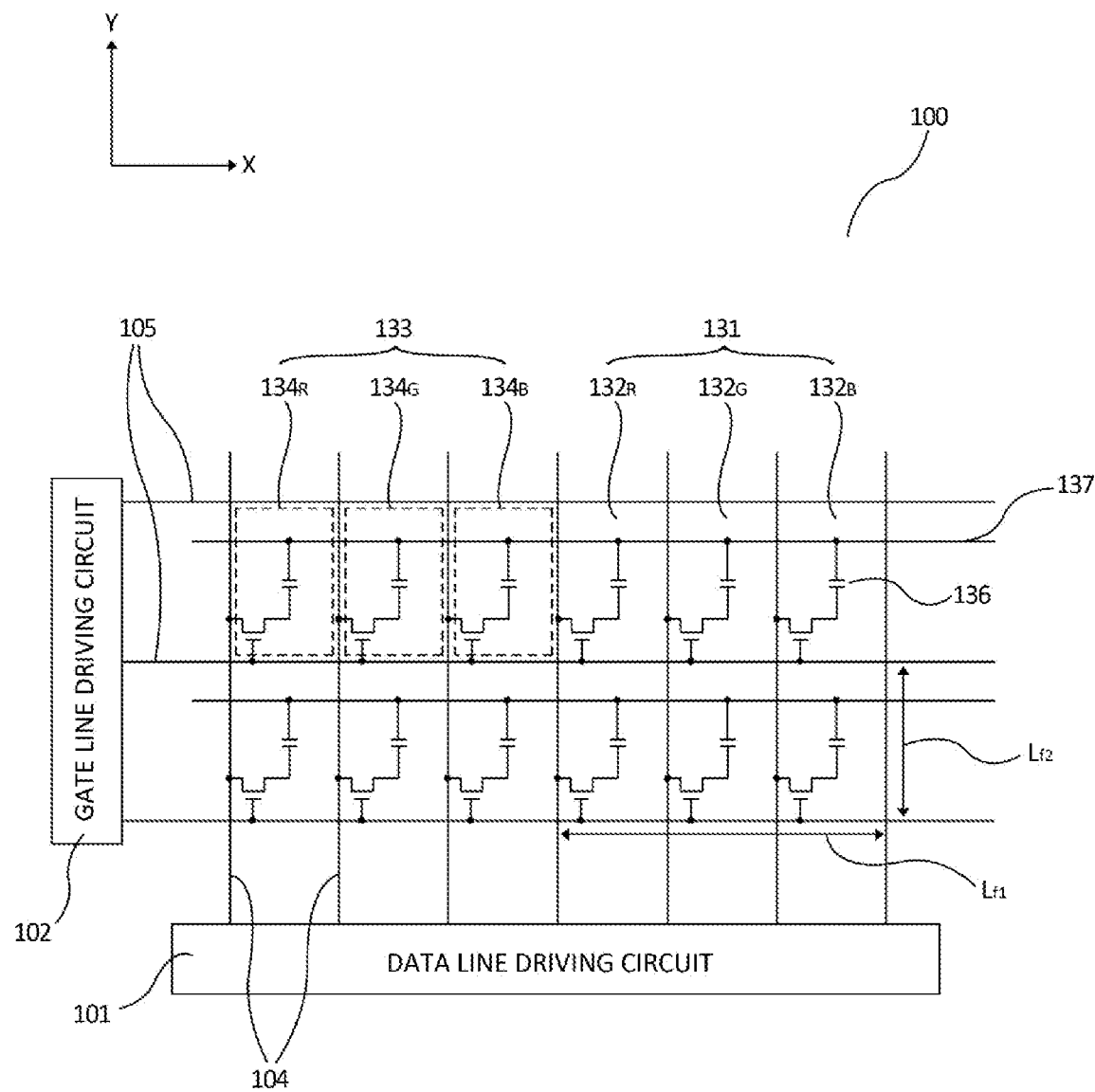
FIG. 4A is a schematic diagram of the color pixels of the first display pane according to the exemplary embodiments of the present disclosure.
Figure 4B:
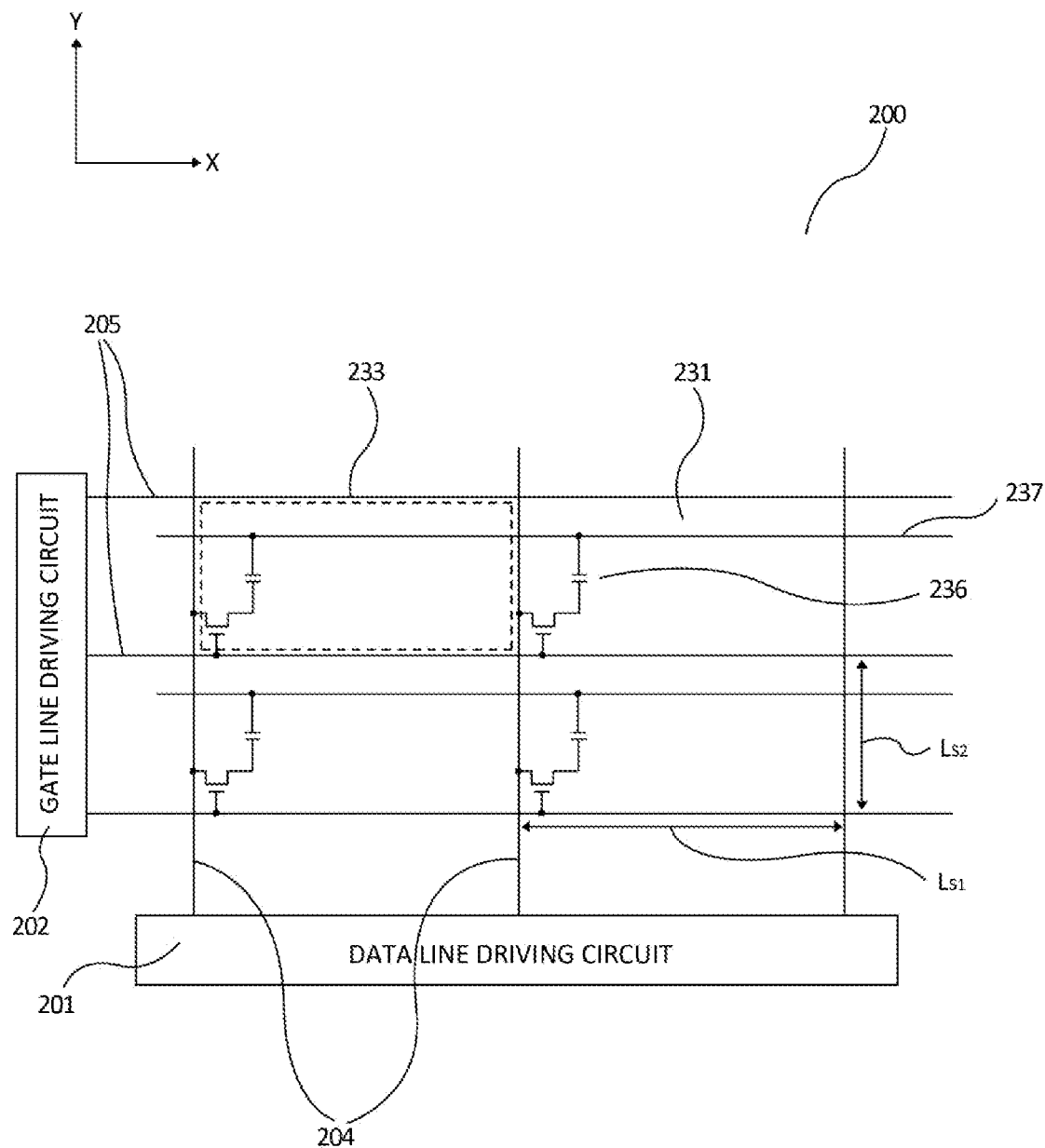
FIG. 4B is a schematic diagram of the contrast pixels of the second display panel according to the exemplary embodiments of the present disclosure.
Figure 5:
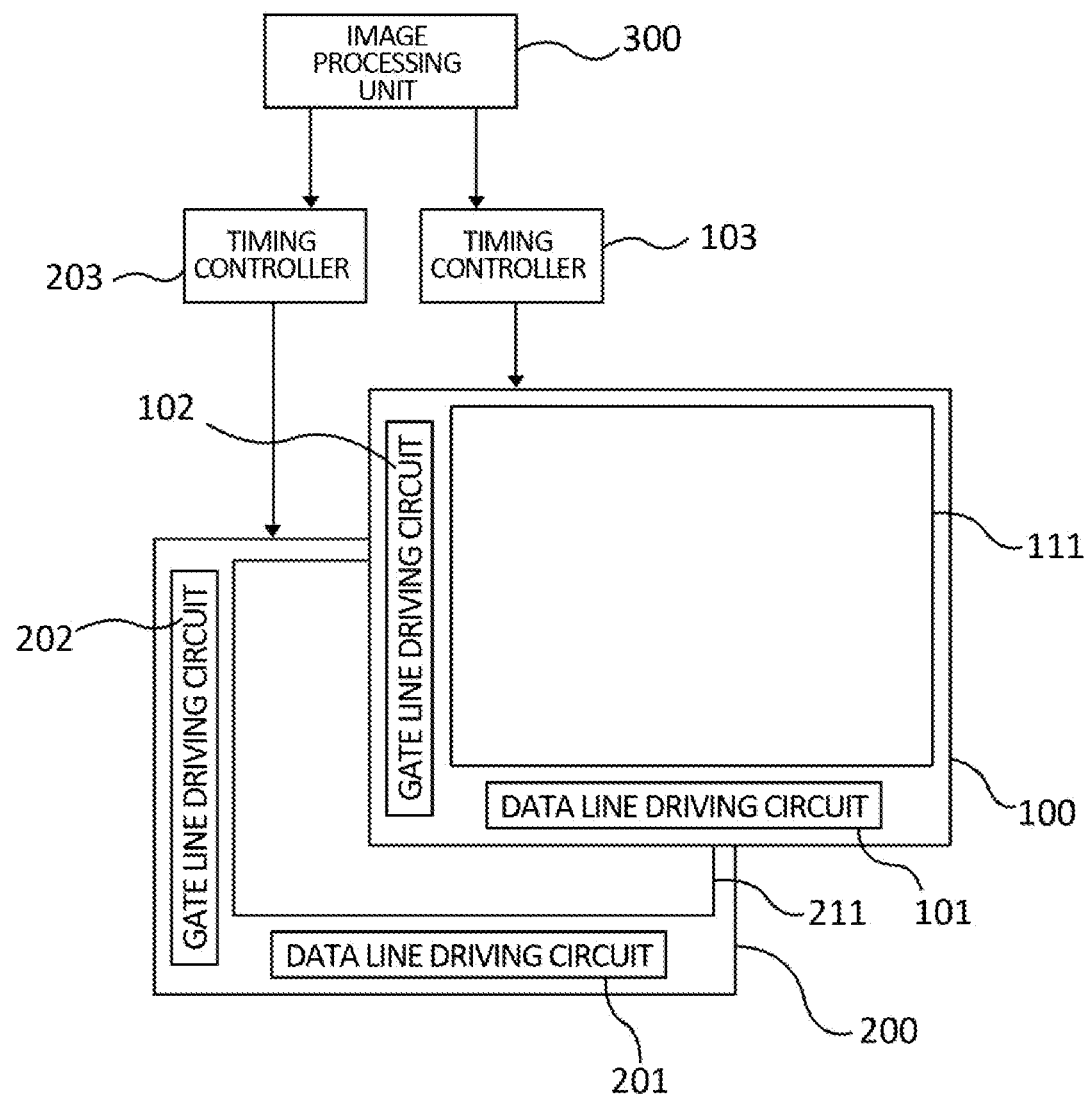
FIG. 5 illustrates the connections between the first and second display panels and their respective driving circuits and controllers of the LCD device according to the exemplary embodiments of the present disclosure.

As illustrated in FIGS. 4A and 4B, each display panel 100, 200 includes a data line driving circuit 101, 201, a gate line driving circuit 102, 202, and a timing controller 103, 203 (See FIG. 5). The driving circuits drive the display panel while the timing controller controls the driving circuit. The color pixels 131, consisting of color sub-pixels $132_R$, $132_G$, $132_B$, and the contrast pixels 231 are arranged into a matrix shape in row and column directions. Color sub-pixel $132_R$ filters red light, color sub-pixel $132_G$ filters green light, and color sub-pixel $132_B$ filters blue light. Two adjacent data lines 104, 204 and two adjacent gate lines 105, 205 surround each color sub-pixel 132 and contrast pixel 231. The gate lines 105, 205 extend in a first direction and the data lines 104, 204 extend in a second direction. While in FIGS. 4A and 4B, the first direction is along the X direction and the second direction is along the Y direction, it should be appreciated that the first and second directions are not limited to this configuration. It is also contemplated that the color pixels 131, the color sub-pixels 132, and the contrast pixels 231 may have non-rectangular shapes.

Each color sub-pixel 132 and contrast pixel 231 has a capacitor 136, 236 configured to generate electric field for controlling the liquid crystal pertaining to that particular pixel. Said a capacitor 136, 238 is electrically connected to one of the gate lines 105, 205, a respective one of the data lines 104, 204, and a common electrode electrical line 137, 237.

The respective sizes 134, 233 of the color sub-pixel 132 and the contrast pixel 231 are the area approximately defined by the adjacent data lines 104, 204 and adjacent gate lines 105, 205. The size 133 of the color pixel 131 is the sum of the sizes $134_R$, $134_G$, $134_B$ of the adjacent color sub-pixels $132_R$, $132_G$, $132_B$, comprising the color pixel 131.

To produce an image, the light from the backlight unit is controlled pixel by pixel (or sub-pixel by sub-pixel) by the liquid crystal. The driving circuits switch the alignment of the liquid crystal between a state in which the polarized light incident to the polarizers is rotated by about 90°, a state in which the polarized light is not rotated, and any intermediate states as desired. A common electrode and a pixel electrode are provided for each pixel or sub-pixel, applying an electric field to the liquid crystal. The liquid crystal rotates by dielectric anisotropy according to the electric field between the common electrode and the pixel electrode thereby allowing or disallowing light to be transmitted through the liquid crystal. The TFTs act as switches, individually controlling the voltage on each pixel or sub-pixel. The liquid crystal corresponding to a particular pixel or sub-pixel are controlled so that each pixel displays the appropriate intensity of color for displaying the desired image. It is contemplated that the display function of the LCD device may be achieved using different display modes such as TN (twisted nematic) mode, VA (vertical alignment) mode, IPS (in-plain switching) mode, FFS (fringe field switching) mode, and the like.

Figure 6:
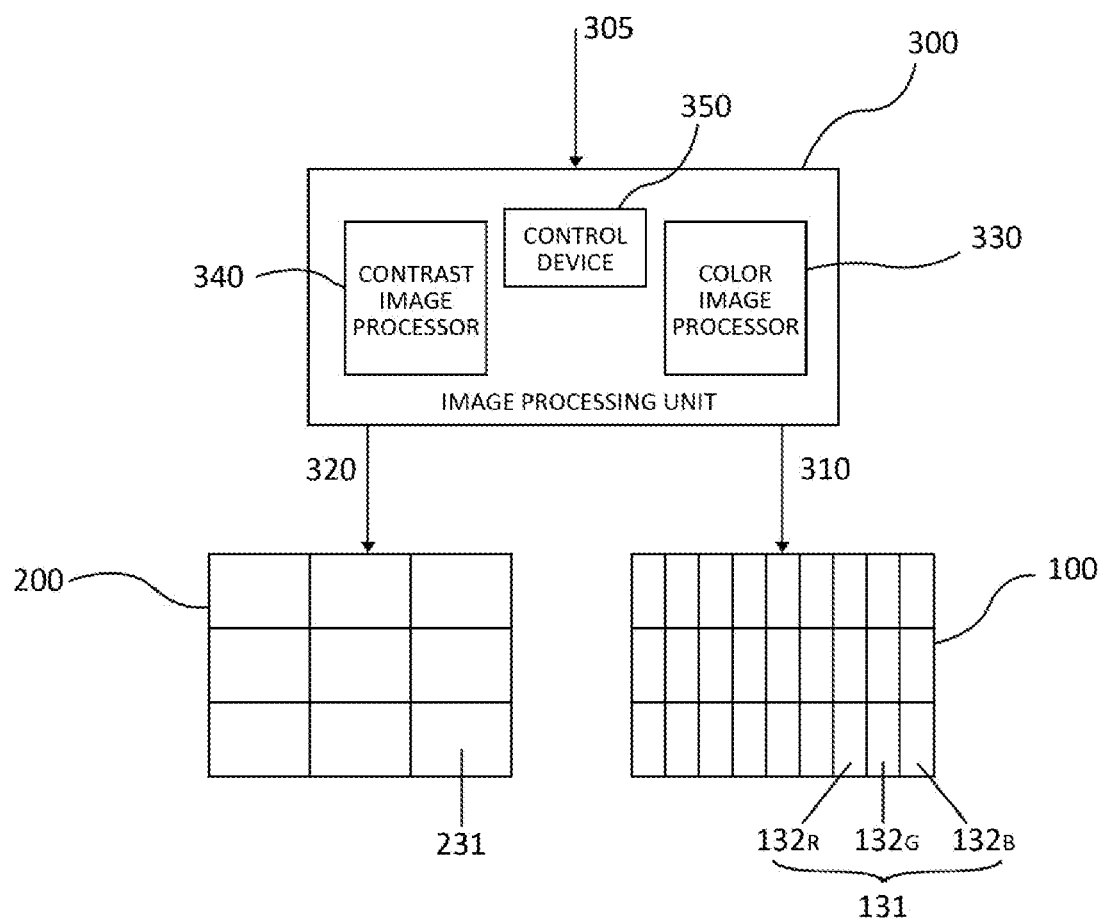
FIG. 6 is a schematic diagram of the components of an image processing unit of the LCD device according to the exemplary embodiments of the present disclosure.

Referring to FIGS. 5 and 6, an image processing unit 300 generates a color image data 310 for the first display panel 100 and a contrast image data 320 for the second display panel 200 based on an external input image data 305. The color image data 310 control the color pixels 131 while the contrast image data 320 control the contrast pixels 231. The color image data 310 and the contrast image data 320 are generated so that the pairs of corresponding color pixels 131 and contrast pixels 231 filter the light from the backlight unit 9 (not shown) to form pixels of the desired image. The color image data 310 may include color values which dictate the amount of light each color sub-pixel 132 of a color pixel 131 should filter. Similarly, the contrast image data 320 may include contrast values which dictate the amount of light a contrast pixel 231 should filter.

As illustrated in FIG. 6, the image processing unit 300 includes a color image processor 330 and a contrast image processor 340. In particular, the color image processor 330 generates the color image data 310 and the contrast image processor 340 generates the contrast image data 320 based on the external input image data 305 received by the image processing unit 300. The image processing unit 300 then provides the corresponding signals to the data line driving circuit 101, 201, and the gate line driving circuit 102, 202, of the display panels 100, 200 to produce the desired image (See FIG. 5).

In an embodiment of the present disclosure, the size 233 of the contrast pixels 231 of the second display panel 200 of LCD device 10 is larger than the size 133 of the color pixels 131 of the first display panel 100.

Figure 1:
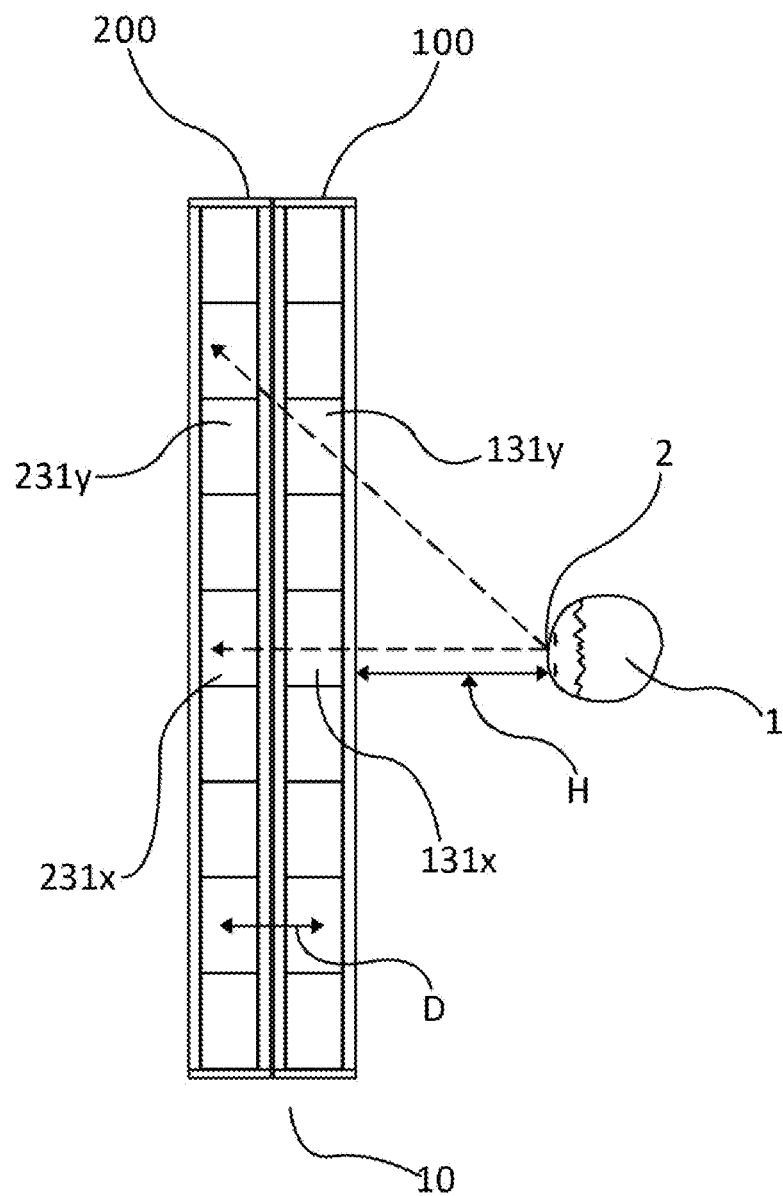
FIG. 1 is a schematic diagram illustrating the alignment of the pixels of two display panels stacked on top of each other according to a conventional LCD device.
Figure 7:
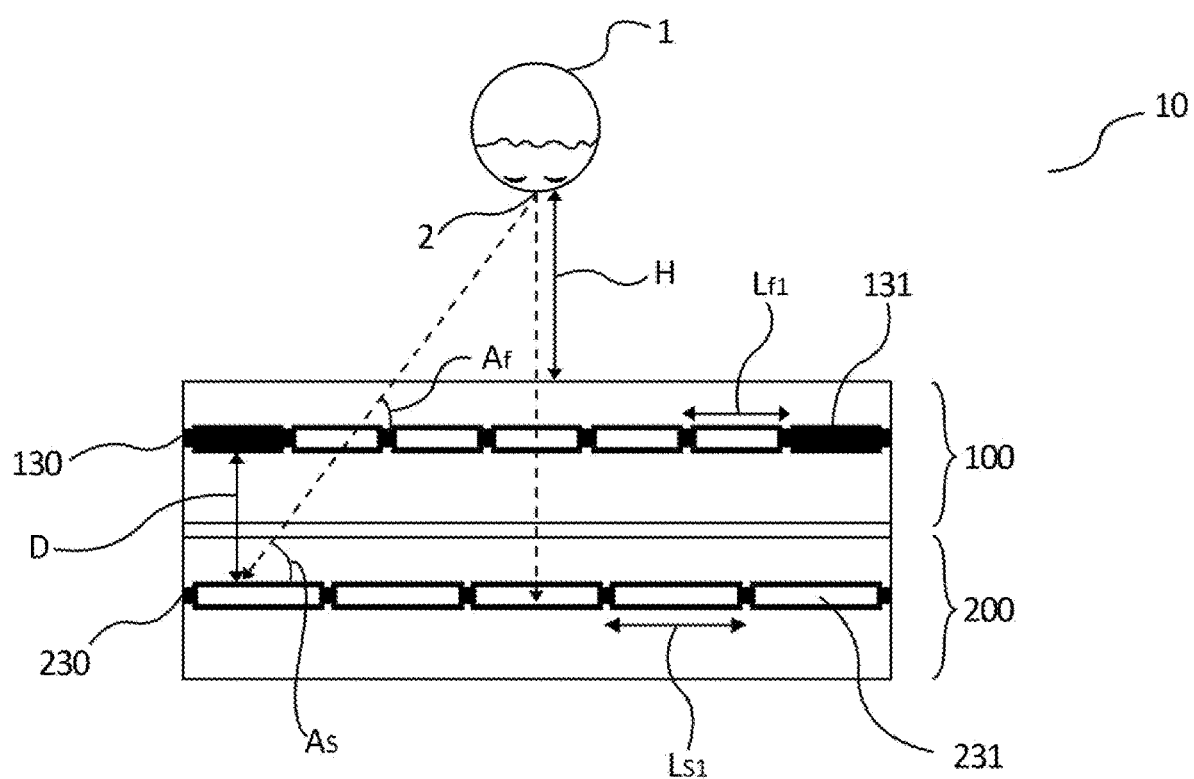
FIG. 7 is a schematic diagram illustrating the alignment of the pixels of the first and second display panels of the LCD device of FIG. 2 according to the exemplary embodiments of the present disclosure.

Illustrated in FIG. 7 is the LCD device 10, comprising of the first display panel 100 and the second display panel 200, viewed by the person 1 at the distance H from the first display panel 100. Because of the components of the display panels as well as other components that are positioned between them, the first display panel 100 and the second display panel 200 are separated by a gap D. The gap D may be the distance between the color filter layer 130 of the first display panel 100 and the contrast filter layer 230 of the second display panel 200. As a result of the gap D, the image produced by the second display panel 200 is displaced from the image produced by the first display panel 100 because the color pixel 131 does not properly align with its corresponding contrast pixel 231 when viewed from position 2, said position 2 is the location of the eyes of person 1 (see FIG. 1). To prevent this image displacement, the size 233 of the contrast pixels 231 of the second display panel 200 is larger than the size 133 of the color pixels 131 of the first display panel 100, in accordance with an embodiment of the present disclosure.

As shown in FIGS. 4A, 4B and 7, the color pixel 131 has a length $L_{f1}$ and the contrast pixel 231 has a length $L_{s1}$ that extend in the first direction of the gate lines 105, 205 (e.g., the X direction in FIGS. 4A and 4B). Similarly, the color pixel 131 has a length $L_{f2}$ and the contrast pixel 231 has a length $L_{s2}$ that extends in the second direction of the data lines 104, 204 (e.g., the Y direction in FIGS. 4A and 4B).

To ensure that color pixel 131 aligns with its corresponding contrast pixel 231 when viewed from position 2 by person 1 at the distance H, an angle $A_f$ that the color pixel 131 makes with position 2 must be the same as an angle $A_s$ that the contrast pixel 231 makes with position 2 (See FIG. 7). Accordingly, the ratio of the length $L_{s1}$ of the contrast pixel 231 and the length $L_{f1}$ of the color pixel 131 is shown by the following equation:

$$\frac{Ls1}{Lf1} = \frac{H+D}{H} \quad (1)$$

Based on equation (1), the length $L_{s1}$ may be expressed in terms of the length $L_{f1}$ as follows:

$$Ls1 = \frac{H+D}{H} Lf1 \quad (2)$$

It should be appreciated that for the length $L_{f2}$ of the color pixel 131 and the length $L_{s2}$ of the contrast pixel 231 extending along the second direction of the data lines 104, 204, the relationship of the length $L_{s2}$ and the length $L_{f1}$ is expressed in the same equation:

$$Ls2 = \frac{H+D}{H} Lf2 \quad (2)$$

Since the gap D may be due to components of the display panels as well as other components that are positioned between the first display panel 100 and the second display panel 200, the gap D may be approximated from the components and materials used in manufacturing the LCD device 10. As for the distance H, this may be approximated as the typical distance of the person 1 viewing the LCD display 10 depending on the use for which the display is intended.

In an embodiment of the present disclosure, the length $L_{s1}$, $L_{s2}$ of the contrast pixel 231 is within the range of 1.003 to 1.150 times longer than the length $L_{f1}$, $L_{f2}$ and of the color pixel 131. Accordingly, the size 233 of the contrast pixel 231 is within the range of 1.006 to 1.323 times larger than the size 133 of the color pixel 131. Likewise, the area 211 of the second display panel 200 is within the range of 1.006 to 1.323 times larger than the area 111 of the first display panel 100 (See FIG. 2).

In another embodiment of the present disclosure, the image processing unit 300 of the LCD device 10 is further comprised of a control device 350 (See FIG. 6) which switches the image processing unit 300 to a first mode or a second mode. The image processing unit 300 generates the contrast image data 320 depending on the mode it is switched on.

Figure 8A:
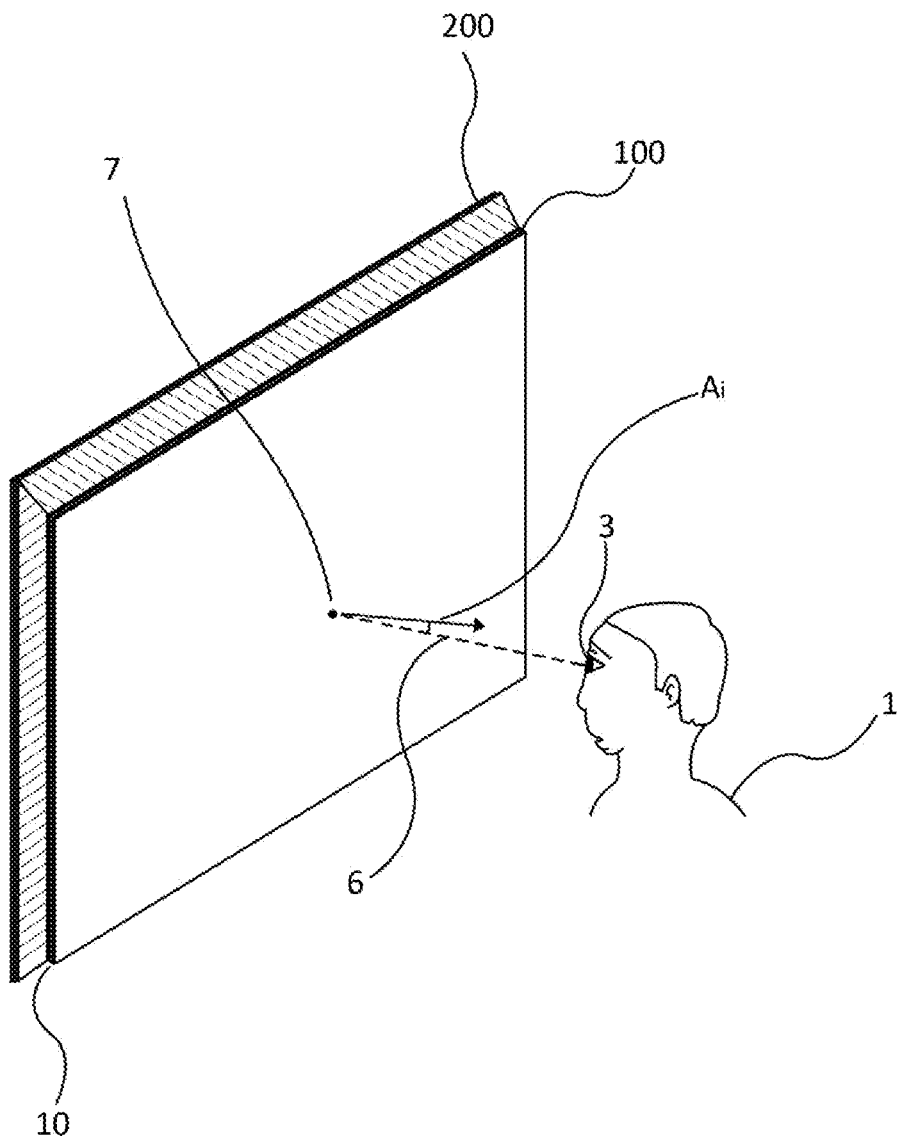
FIG. 8A is a perspective view schematically illustrating the LCD device and a person viewing the said LCD device from the center position.

As illustrated in FIG. 8A, in the first mode, the person 1 views the LCD device 10 from a center position 3, said center position 3 is the location of the eyes of person 1. In the center position 3, a line of sight 6 of the person 1 is almost normal to a center point 7 of the display surface of the first display panel 100 of the LCD device 10. As shown in FIG. 8A, an angle of incidence $A_i$ of the line of sight 6 is less than 10 degrees.

Figure 8B:
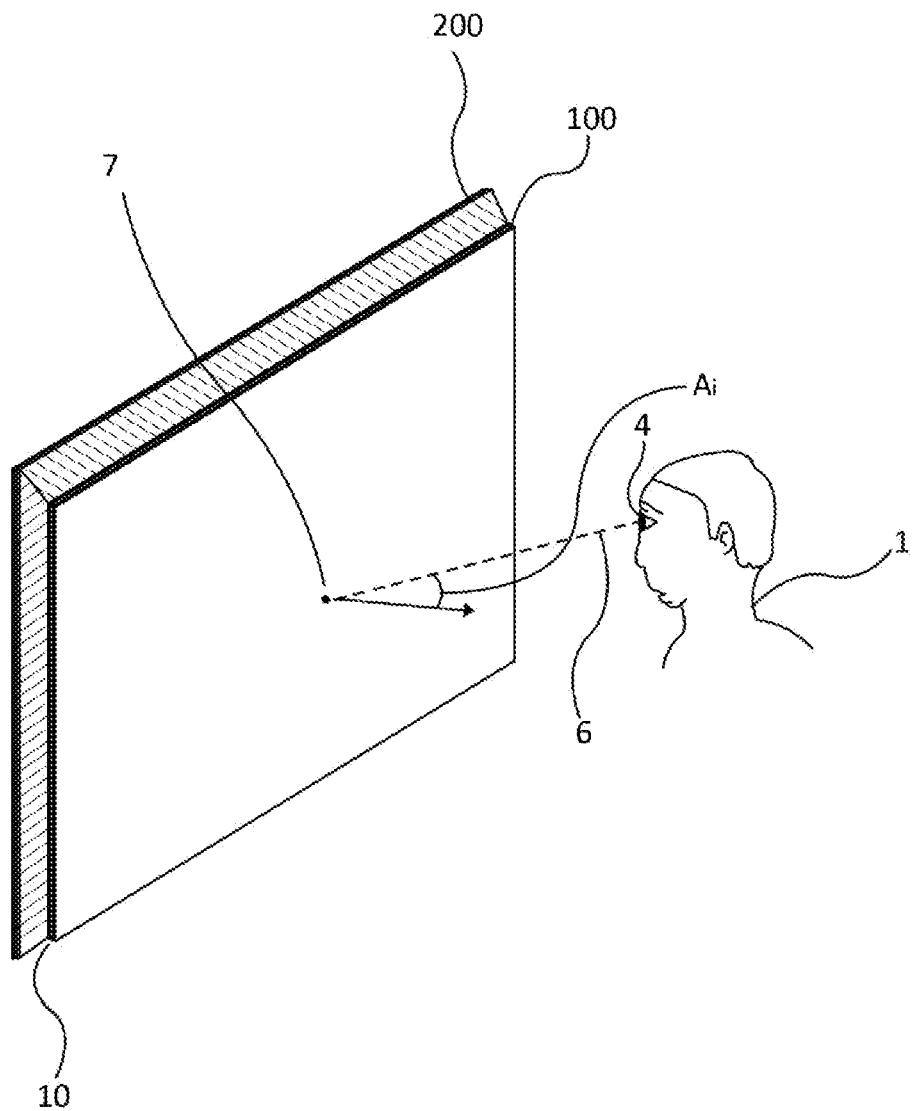
FIG. 8B is a perspective view schematically illustrating the LCD device and a person viewing the said LCD device from the periphery position.

In the second mode, the person 1 views the LCD device 10 from a periphery position 4, said periphery position 4 is the location of the eyes of person 1, as shown in FIG. 8B. In the periphery position 4, the angle of incidence $A_i$ of the line of sight 6 is 10 degrees or greater than 10 degrees.

Under the second mode, the generation of the contrast image data may include applying an expansion using known method to account for the periphery position 4 of person 1. This expansion modifies the resulting contrast image data 320 so that each contrast pixel 231 provides the correct amount of light to the color pixel 131 to which the contrast pixel 231 is aligned to with when viewed from the periphery position 4. Said color pixel 131 to which the contrast pixel 231 is aligned with is not necessarily its corresponding color pixel 131. It is contemplated that the expansion under the second mode may vary depending on the periphery position 4 of person 1. The amount of expansion applied to the contrast image data 320 may be based on the angle of incidence $A_i$ of the line of sight 6 of person 1.

Under the first mode, no or less expansion is applied. The contrast image data 320 are generated so that each contrast pixel 231 provides an amount of light with less supplement to its corresponding color pixel 131.

Because of the expansion, the image generated by the image processing unit 300 based on the contrast image data 320 under the second mode is more blurred than the image generated using the contrast image data 320 under the first mode.

Figure 9:
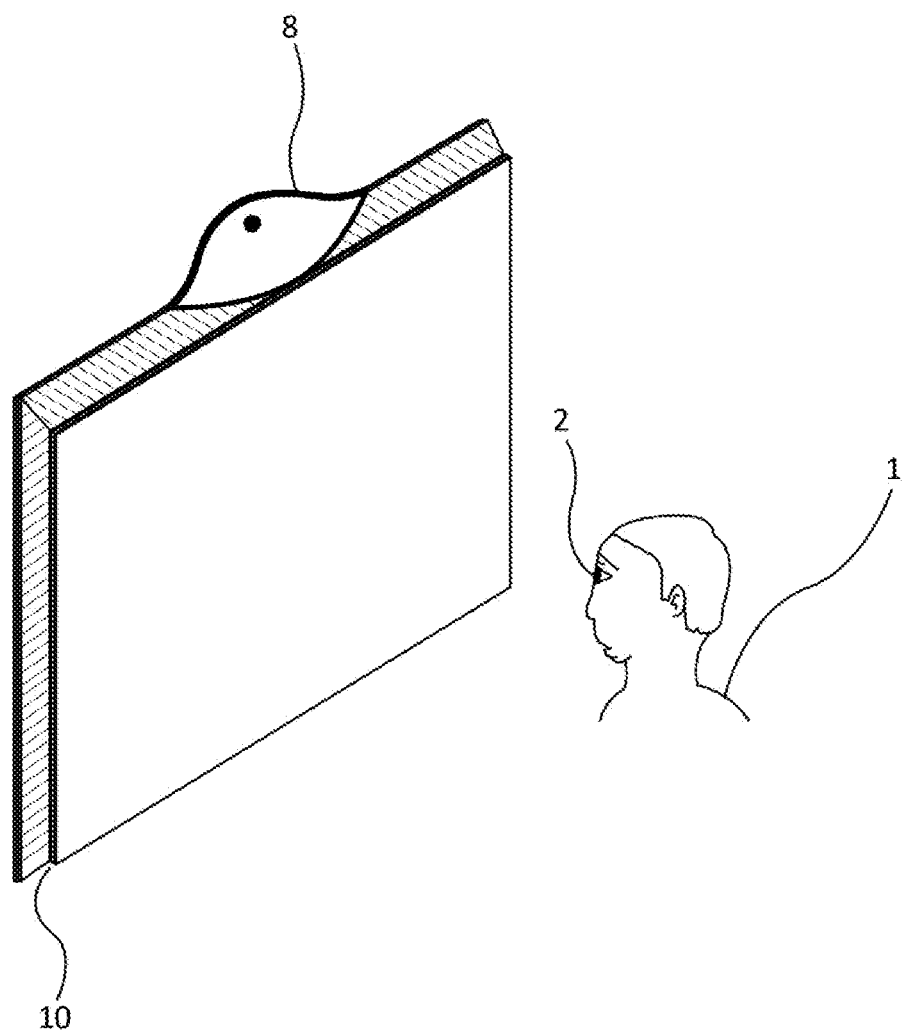
FIG. 9 is a perspective view schematically illustrating the LCD device with a sensing device.

In an embodiment of the present disclosure, the control device 350 may be controlled manually or may automatically adjust depending on the position 2, said position 2 is the location of the eyes of person 1. As shown in FIG. 9, the LCD device 10 includes a sensing device 8 configured to detect the location of the eyes of person 1. Said sensing device 8 may be a camera. It should be appreciated that the sensing device is not limited to a camera and may be any device that can be used to determine the position 2 of person 1 such as a proximity sensor, laser displacement sensor, or heat detector.

Based on the detected position 2 of person 1, the control device 350 switches to the first mode or the second mode. Using known method, the angle of incidence $A_i$ of the line of sight 6 of person 1 is measured. The control device may be configured to switch to the first mode when the angle of incidence $A_i$ of the line of sight 6 is less than 10 degrees and to the second mode when the angle of incidence $A_i$ is 10 degrees or greater than 10 degrees.

Alternatively, the person 1 may manually adjust the control device 350 to the first mode or the second mode, through an input unit (not shown), such as on a touch screen or a button.

In another embodiment of the present disclosure, the LCD device 10 is further comprised of an adjuster device 400 configured to change the relative position between the first display panel 100 and the second display panel 200.

Figure 10:
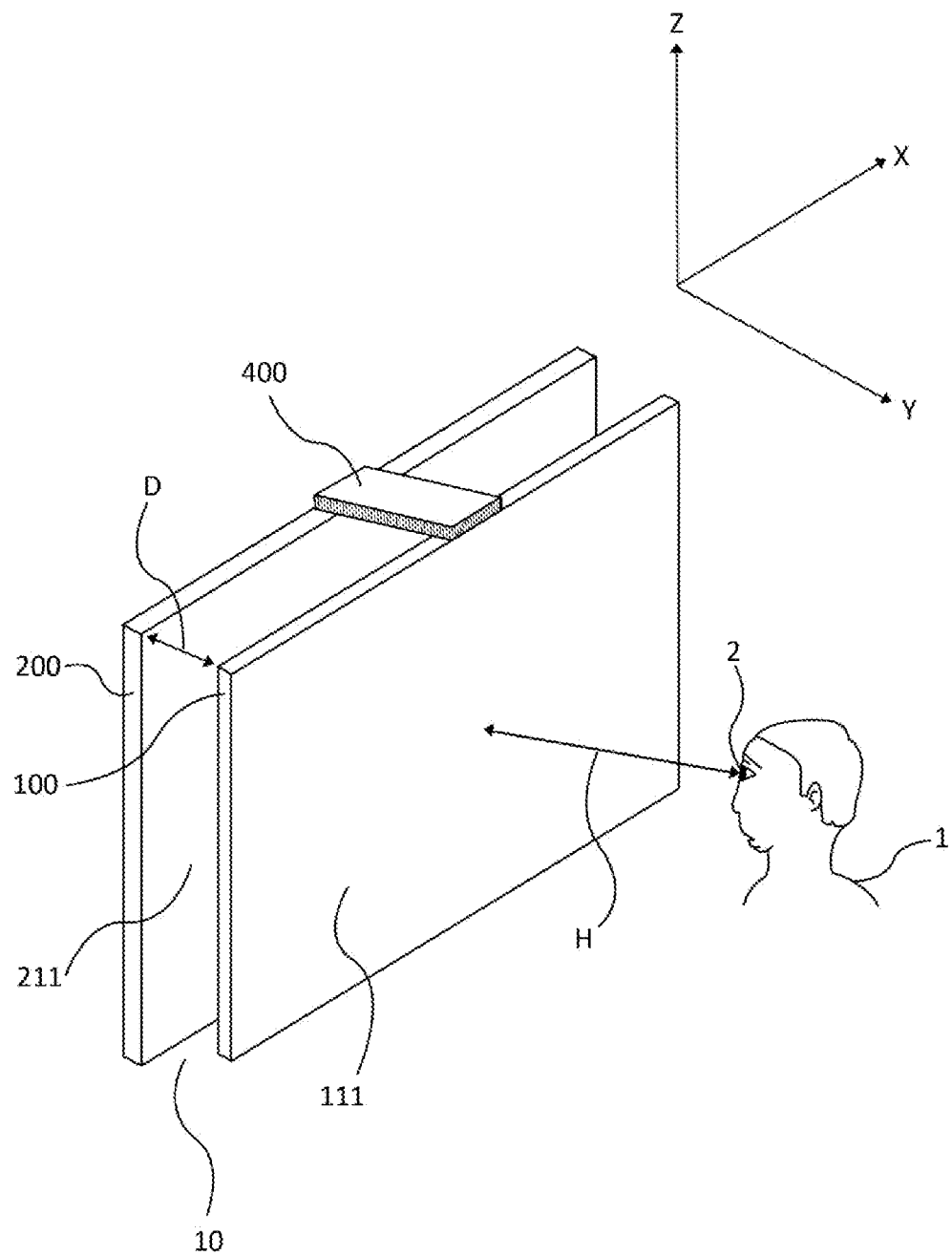
FIG. 10 is a perspective view schematically illustrating the LCD device with an adjuster device.

Illustrated in FIG. 10 is the LCD device 10, comprising of the first display panel 100 and the second display panel 200, viewed by the person 1 at the distance H from the first display panel 100. The first display panel 100 is closer to the person 1 than the second display panel 200. Because of the components of the display panels as well as other components that are positioned between them, the first display panel 100 and the second display panel 200 are separated by a gap D. The gap D may be the distance between the color filter layer 130 of the first display panel 100 and the contrast filter layer 230 of the second display panel 200. As a result of the gap D, the image produced by the second display panel 200 is displaced from the image produced by the first display panel 100 because the color pixel 131 does not properly align with its corresponding contrast pixel 231 when viewed from position 2, said position 2 is the location of the eyes of person 1 (see FIG. 1). To prevent this image displacement, the relative position between the first display panel 100 and the second display panel 200 is changed by the adjuster device 400 based on the position 2 of person 1, in accordance with an embodiment of the present disclosure.

As shown in FIG. 10, the adjuster device 400 may change the relative position of the first display panel 100 and the second display panel 200 along the plane parallel to the display areas 111, 211 of the display panels. In particular, the adjuster device 400 may change the relative position of the display panels in the first direction of the gate lines 105, 205 (e.g., the X direction in FIG. 10) or in the second direction of the data lines 104, 204 (e.g., the Y direction in FIG. 10). The adjuster device 400 may also change the relative position of the first display panel 100 and the second display panel 200 along the direction parallel to the gap D (e.g., the Z direction in FIG. 10). This changes the gap D between the display panels.

The adjuster device 400 changes the relative position of the first display panel 100 and the second display panel 200 to ensure that color pixel 131 aligns with its corresponding contrast pixel 231 when viewed from position 2 by person 1 at the distance H.

It is contemplated that the adjuster device 400 may be controlled manually or automatically through a sensing device configured to detect the location of the eyes of person 1. It should be appreciated that the sensing device is not limited to a camera and may be any device that can be used to determine the position 2 of person 1 such as a laser displacement sensor or a heat detector.

Although many subject matters have been specifically disclosed in the foregoing description, they should be construed as illustrations of various embodiments rather than a limitation to the scope of the present disclosure. The present disclosure should not be limited by the embodiments disclosed herein but should be determined by the claims and the equivalents thereof.

What is claimed is:

1. A liquid crystal display (LCD) device comprising:
a first display panel having a plurality of pixels; and
a second display panel having a plurality of pixels, the first and the second display panels being positioned in a stacked configuration in a plan view,
wherein a size of a pixel from the plurality of pixels in the second display panel is larger than a size of a pixel from the plurality of pixels in the first display panel,
wherein a plurality of gate lines extending in a first direction,
a plurality of data lines extending in a second direction,
wherein a length in the first direction of the second pixel from the plurality of second pixels in the second display panel is longer than a length in the first direction of the first pixel from the plurality of first pixels in the first display panel,
wherein the length in the first direction of the second pixel from the plurality of second pixels in the second display panel is within a range of 1.003 to 1.15 times longer than the length in the first direction of the first pixel from the plurality of first pixels in the first display panel,
wherein the LCD device further comprises an image processing unit configured to:
receive an external input image data;
generate a color image data for the first display panel based on the external input image data; and
generate a contrast image data for the second display panel based on the external input image data,
wherein the image processing unit switches to a first mode or a second mode, the image processing unit generates a first contrast image data in the first mode or a second contrast image data in the second mode, and
the image processing unit generates a first image based on the first contrast image data and a second image based on the second contrast image data, the second image being more blurred than the first image.

2. The LCD device according to claim 1, further comprising a control device configured to switch the image processing unit to the first mode or the second mode.

3. The LCD device according to claim 2, further comprising a sensing device that detects a position of a person viewing the LCD device, wherein the control device switches the image processing unit to the first mode or the second mode depending on the position of the person.

4. The LCD device of claim 3, wherein the sensing device is a camera.

* * * * *